US012770361B2

(12) United States Patent
Koike

(10) Patent No.: US 12,770,361 B2
(45) Date of Patent: Oct. 20, 2026

(54) IMAGE PROCESSING DEVICE, IMAGE PROCESSING METHOD, AND IMAGE PROCESSING PROGRAM

(71) Applicant: FUJIFILM CORPORATION, Tokyo (JP)

(72) Inventor: Tatsuki Koike, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 126 days.

(21) Appl. No.: 19/047,647

(22) Filed: Feb. 7, 2025

(65) Prior Publication Data

US 2025/0299470 A1 Sep. 25, 2025

(30) Foreign Application Priority Data

Mar. 22, 2024 (JP) ................................ 2024-047320

(51) Int. Cl.

*G06V 10/75* (2022.01)
*G06V 10/40* (2022.01)
*G06V 10/77* (2022.01)

(52) U.S. Cl.

CPC ........... *G06V 10/751* (2022.01); *G06V 10/40* (2022.01); *G06V 10/7715* (2022.01); *G06V 2201/031* (2022.01)

(58) Field of Classification Search

CPC .. G06V 10/751; G06V 10/7715; G06V 10/40; G06V 2201/031

See application file for complete search history.

(56) References Cited

U.S. PATENT DOCUMENTS

2023/0059426 A1* 2/2023 Liu et al. ................. G06T 7/73

FOREIGN PATENT DOCUMENTS

CN 113506334 B * 12/2023 ............ G06T 17/00
JP 2023-029225 A 3/2023

* cited by examiner

*Primary Examiner* — Utpal D Shah
*Assistant Examiner* — Matthew James Bodnark
(74) *Attorney, Agent, or Firm* — SOLARIS Intellectual Property Group, PLLC

(57) ABSTRACT

An image processing device sets a first point on a medical image including a detection target, and detects a feature point of the detection target from the medical image by performing, a predetermined number of times, a binary search based on the first point and a second point different from the first point on the medical image.

14 Claims, 7 Drawing Sheets

IMAGE PROCESSING DEVICE, IMAGE PROCESSING METHOD, AND IMAGE PROCESSING PROGRAM

CROSS-REFERENCE TO RELATED APPLICATIONS

This application claims priority from Japanese Patent Application No. 2024-047320, filed on Mar. 22, 2024, the entire disclosure of which is incorporated herein by reference.

BACKGROUND

1. Technical Field

The present disclosure relates to an image processing device, an image processing method, and an image processing program.

2. Description of the Related Art

JP2023-029225A discloses a technology of acquiring a three-dimensional positioning image or a two-dimensional positioning image having a plurality of layers of an organ, positioning a segment in which the organ is present in a layer direction of a plurality of slices included in the positioning image based on the acquired positioning image, and performing image segmentation processing on the positioning image in the segment in which the organ is present.

SUMMARY

A feature point such as a boundary of the organ is detected from a heat map representing a range of the organ in a medical image. Meanwhile, in a case in which processing of detecting the feature point is performed on an image having a relatively large amount of data, such as a high-resolution medical image, an amount of calculation is increased. Therefore, it is preferable that the feature point can be efficiently detected from the medical image.

The present disclosure has been made in view of the above-described circumstances, and an object of the present disclosure is to provide an image processing device, an image processing method, and an image processing program, which are capable of efficiently detecting a feature point from a medical image.

The present disclosure provides an image processing device comprising: a processor, in which the processor is configured to: set a first point on a medical image including a detection target; and detect a feature point of the detection target from the medical image by performing, a predetermined number of times, a binary search based on the first point and a second point different from the first point on the medical image.

In addition, the present disclosure provides an image processing method executed by a processor of an image processing device, the image processing method including: setting a first point on a medical image including a detection target; and detecting a feature point of the detection target from the medical image by performing, a predetermined number of times, a binary search based on the first point and a second point different from the first point on the medical image.

In addition, the present disclosure provides an image processing program causing a processor of an image processing device to execute a process including: setting a first point on a medical image including a detection target; and detecting a feature point of the detection target from the medical image by performing, a predetermined number of times, a binary search based on the first point and a second point different from the first point on the medical image.

According to the present disclosure, the feature point can be efficiently detected from the medical image.

DETAILED DESCRIPTION

Hereinafter an embodiment for carrying out the present disclosed technology will be described in detail with reference to the accompanying drawings.

Figure 1:
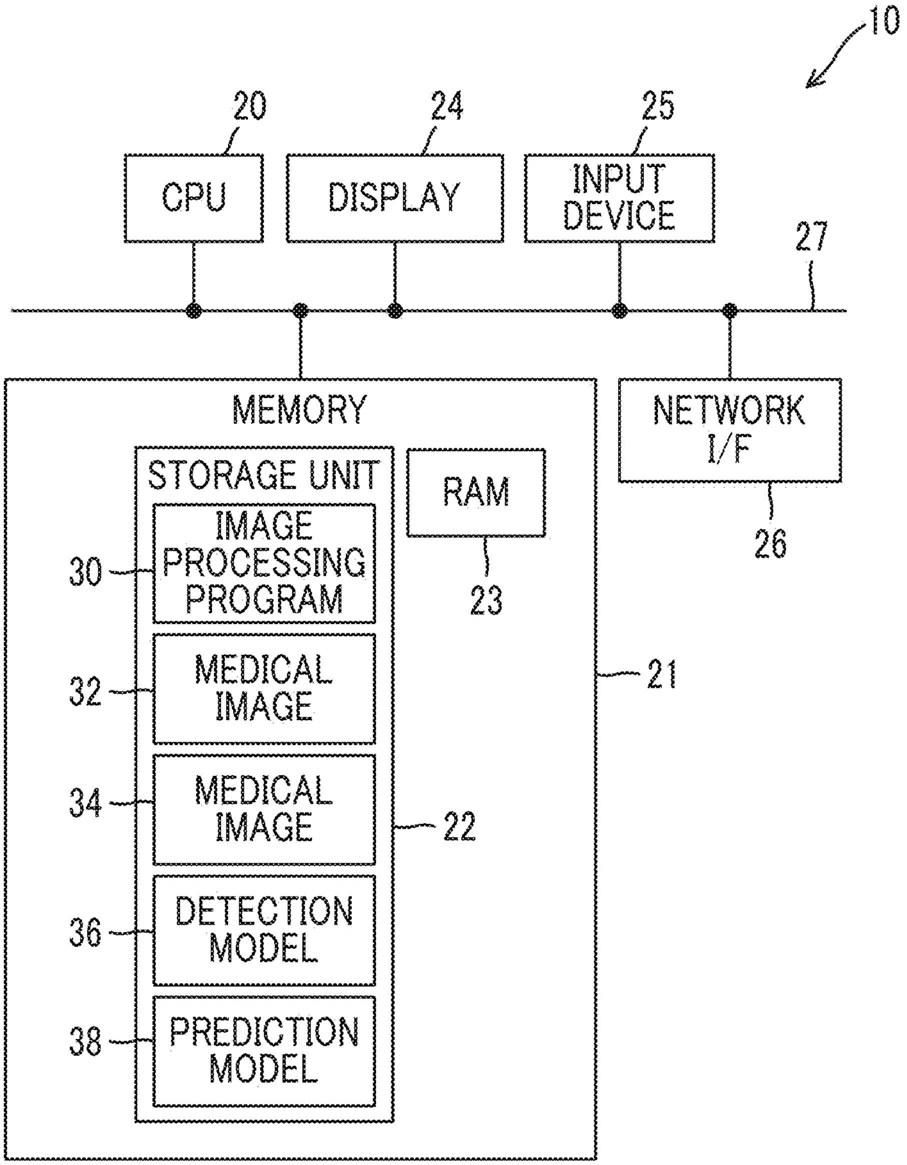
FIG. 1 is a block diagram showing an example of a hardware configuration of an image processing device.

First, a hardware configuration of an image processing device 10 according to the present embodiment will be described with reference to FIG. 1. As shown in FIG. 1, the image processing device 10 includes a central processing unit (CPU) 20, a memory 21, a display 24, an input device 25, and a network interface (I/F) 26. Examples of the image processing device 10 include a computer, such as a personal computer or a server computer.

The CPU 20 executes a program stored in a storage unit 22, which will be described later, to implement various functions. The CPU 20 is an example of a processor according to the present disclosed technology.

The memory 21 includes the storage unit 22 and a random-access memory (RAM) 23. The RAM 23 is a primary storage memory, and is, for example, a RAM such as a static random-access memory (SRAM) or a dynamic random-access memory (DRAM).

The storage unit 22 is a non-volatile memory, and is implemented by, for example, at least one of a hard disk drive (HDD), a solid-state drive (SSD), or a flash memory. The storage unit 22 as a storage medium stores an image processing program 30. The CPU 20 reads out the image processing program 30 from the storage unit 22, loads the readout image processing program 30 into the RAM 23, and executes the loaded image processing program 30.

The display 24 is a device that displays various screens, and is, for example, a liquid crystal display or an electro luminescence (EL) display. The input device 25 is a device for a user to perform input, and is, for example, at least any of a keyboard, a mouse, a microphone for voice input, a touch pad for close contact input including contact, or a camera for gesture input. The network I/F 26 is an interface for connecting to a network. A bus 27 connects the CPU 20, the memory 21, the display 24, the input device 25, and the network I/F 26 to each other.

The storage unit 22 stores a medical image 32, a medical image 34, a detection model 36, and a prediction model 38. The medical image 32 is a two-dimensional medical image that includes a detection target. In the present embodiment, as an example, a case will be described in which a two-dimensional radiation image, which is obtained by irradiating a subject with radiation, such as X-rays, from a front surface to a back surface of the subject, that is, in a so-called anterior-posterior (AP) direction, is applied as the medical image 32. A scout image captured by a computed tomography (CT) apparatus is a more specific example of the medical image 32. The medical image 32 is an example of a first medical image according to the present disclosed technology.

Figure 2:
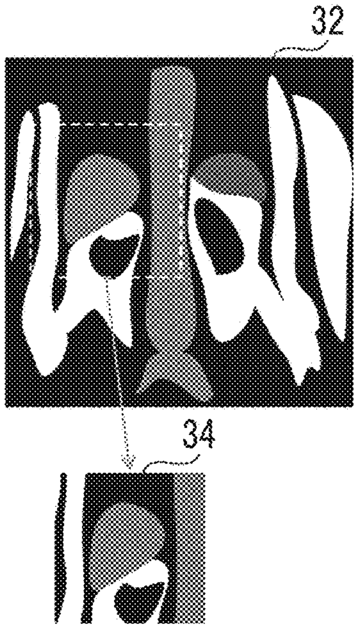
FIG. 2 is a diagram showing a first medical image and a second medical image.

As shown in FIG. 2 as an example, the medical image 34 includes the detection target, and is an image of a part of a range of the medical image 32. In other words, the medical image 34 is also a two-dimensional medical image including the detection target, and is an image showing a narrower range than the medical image 32. For example, the medical image 34 is generated by trimming a part of the range from the medical image 32. The medical image 34 is an example of a second medical image according to the present disclosed technology.

Figure 3:
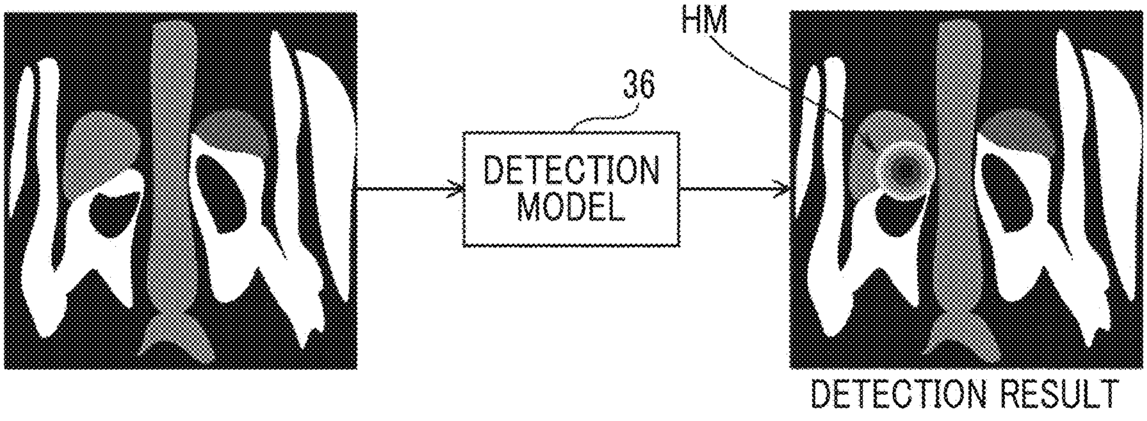
FIG. 3 is a diagram showing a detection model.

The detection model 36 is a trained model obtained in advance through machine learning. As shown in FIG. 3 as an example, the detection model 36 is a model that receives the two-dimensional medical image including the detection target as an input and outputs a detection result of the detection target for the input medical image. In the present embodiment, the detection model 36 outputs a heat map HM representing a range of the detection target as the detection result of the detection target. In the present embodiment, the heat map HM is filled with a predetermined color, such as red, in the range of the detection target. The heat map HM is filled with a higher density as a degree of certainty indicating that the region is the detection target is higher.

The prediction model 38 is a trained model obtained in advance through machine learning. Details of the prediction model 38 will be described later.

The image processing device 10 according to the present embodiment has a function of detecting a feature point of the detection target based on the medical image 32 and the medical image 34. In addition, in the present embodiment, as an example, a case will be described in which a liver is applied as the detection target, and an upper end of the liver is applied as the feature point of the detection target. The feature point is, for example, a landmark point used to define an organ range of the detection target. The organ range is used to define an imaging range of a three-dimensional image obtained by a CT apparatus or a target range of image processing. It should be noted that the detection target may be an organ other than the liver or a region of interest other than the organ, such as a lesion region. In addition, the organ referred to here also includes a bone, a blood vessel, and the like other than an organ located in a thoracic cavity and an abdominal cavity, such as a lung and the liver.

Figure 4:
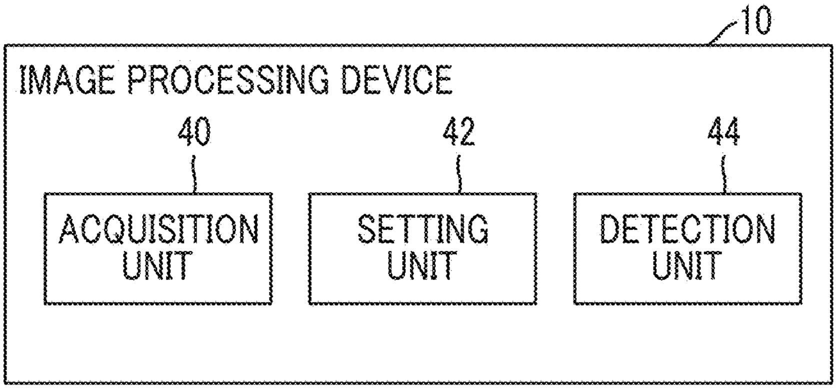
FIG. 4 is a block diagram showing an example of a functional configuration of the image processing device.

A functional configuration of the image processing device 10 will be described with reference to FIG. 4. As shown in FIG. 4, the image processing device 10 includes an acquisition unit 40, a setting unit 42, and a detection unit 44. The CPU 20 executes the image processing program 30, to function as the acquisition unit 40, the setting unit 42, and the detection unit 44.

The acquisition unit 40 acquires the medical image 32 and the medical image 34 from the storage unit 22. The setting unit 42 sets a first point on the medical image 34 based on the detection result of the detection target for the medical image 32 acquired by the acquisition unit 40.

Specifically, first, the setting unit 42 inputs the medical image 32 to the detection model 36. As a result, the detection model 36 outputs the heat map HM, as the detection result of the detection target for the medical image 32. Then, the setting unit 42 sets the first point on the medical image 32 based on the heat map HM. In the present embodiment, the setting unit 42 sets a point set as a point that is easily detected from the medical image 32, as the first point.

As described above, the heat map HM is filled with a higher density as a degree of certainty indicating that the region is the detection target is higher. In a case in which the detection target is the liver, the detection is easier as the distance to the center of the liver is shorter, and thus the degree of certainty may be higher as the distance to the center of the heat map HM is shorter. Therefore, the setting unit 42 sets a center point of the range of the detection target represented by the heat map HM that is the detection result of the detection target for the medical image 32, as the first point, on the medical image 32.

Then, the setting unit 42 sets the first point to a position on the medical image 34 corresponding to the first point on the medical image 32. Specifically, the setting unit 42 performs registration between the medical image 32 and the medical image 34, and sets the first point to the position on the medical image 34 corresponding to the first point on the medical image 32.

Figure 5:
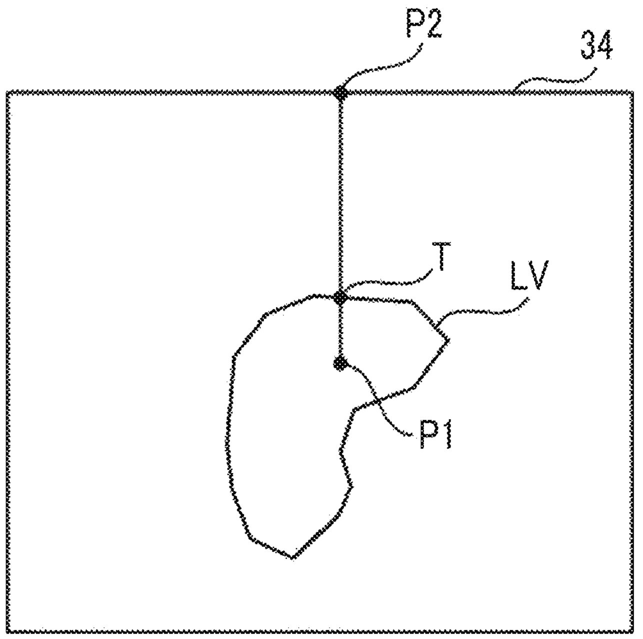
FIG. 5 is a diagram showing processing of setting a second point based on a first point.

In addition, the setting unit 42 sets a second point to a point located such that the first point and the second point interpose the feature point, based on anatomical positions of the detection target and the feature point of the detection target, and a relative positional relationship between the first point and the feature point, on the medical image 34. As shown in FIG. 5, as an example, a case will be described in which a first point P1 based on the heat map HM is set in a liver LV as the detection target, and a feature point T of the detection target, which is unknown, is a point of an upper end part of the liver LV. In such a case, it is considered that the feature point T is present at least above the first point P1 based on the anatomical positions of the liver LV and the feature point T. Therefore, in the present embodiment, the setting unit 42 sets a point of the upper end part of the medical image 34 on an opposite side of the first point P1 with respect to the feature point T based on the relative positional relationship between the first point P1 and the feature point T, as the second point P2, on the medical image 34.

The detection unit 44 detects the feature point T from the medical image 34 by performing, a predetermined number of times, a binary search based on the first point P1 and the second point P2 set on the medical image 34 by the setting unit 42. Hereinafter, a specific example of the binary search via the detection unit 44 will be described.

The detection unit 44 performs first prediction processing of predicting a relative positional relationship between the first point P1 or the second point P2 and the feature point T via a binary classification. In the present embodiment, since the upper end part of the liver LV is applied as the feature point T, as an example, a case will be described in which a positional relationship in an up-down direction of the medical image 34 is applied as the relative positional relationship between the first point P1 or the second point P2 and the feature point T. It should be noted that, for example, in a case in which a left end part or a right end part of the liver LV is applied as the feature point T, a positional relationship in a left-right direction of the medical image 34 may be applied as the relative positional relationship between the first point P1 or the second point P2 and the feature point T.

Figure 6:
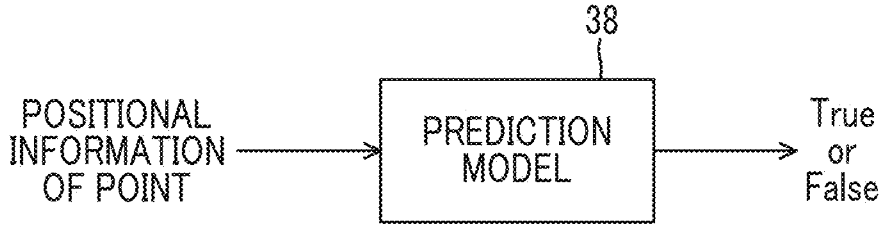
FIG. 6 is a diagram showing a prediction model.

The detection unit 44 uses the prediction model 38 for the first prediction processing. As shown in FIG. 6 as an example, the prediction model 38 is a trained model that receives positional information of a point on the medical image 34 as an input, predicts a position of the unknown feature point T on the medical image 34, and outputs a binary value indicating whether or not the point represented by the input positional information is present above the feature point T as a prediction result. In the present embodiment, as an example, a case will be described in which coordinates (hereinafter, referred to as a "y coordinate") of an axis along the up-down direction with a point at the upper left of the medical image 34 or a center point of the medical image 34 as an origin is applied as the positional information of the point on the medical image 34. In addition, the prediction model 38 outputs True or False as the binary value. Specifically, the prediction model 38 outputs True in a case in which it is predicted that the point represented by the input positional information is present above the feature point T on the medical image 34, and outputs False in a case in which it is predicted that the point represented by the input positional information is not present above the feature point T.

Then, the detection unit 44 performs first movement processing of moving the first point P1 or the second point P2 to a provisional feature point between the first point P1 and the second point P2, based on the prediction result obtained by the first prediction processing.

Figure 7:
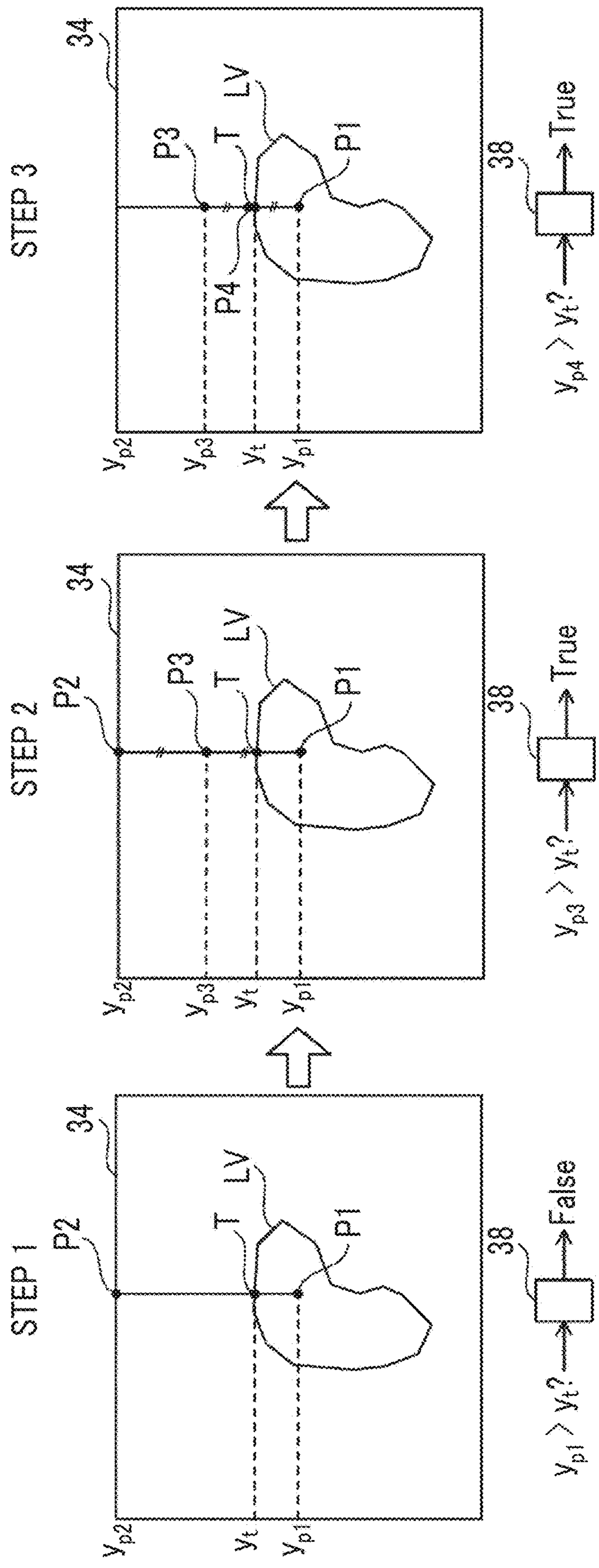
FIG. 7 is a diagram showing binary search processing.

As shown in STEP1 of FIG. 7, for example, the detection unit 44 inputs a y coordinate $y_{p1}$ of the first point P1 to the prediction model 38. It should be noted that $y_t$ in FIG. 7 represents a y coordinate of the feature point T, and $y_{pn}$ represents a y coordinate of a point Pn (n=1, 2, . . . ). In such a case, the prediction model 38 outputs False as the prediction result. Accordingly, the detection unit 44 determines that the feature point T is present above the first point P1, and moves the first point P1 to the provisional feature point between the first point P1 and the second point P2. As shown in STEP 2 of FIG. 7, in the present embodiment, the detection unit 44 moves the first point P1 to a provisional feature point P3 that divides a distance between the first point P1 and the second point P2 into two equal parts. It should be noted that the detection unit 44 may set any point of two points that divides the distance between the first point P1 and the second point P2 into three equal parts, as the provisional feature point P3, or may set any point of three points that divides the distance between the first point P1 and the second point P2 into four equal parts, as the provisional feature point P3. The binary search in the present embodiment represents division between the two points in the up-down direction, and is not limited to the division into two equal parts.

In addition, the detection unit 44 may input a y coordinate $y_{p2}$ of the second point P2 to the prediction model 38. In such a case, the prediction model 38 outputs True as the prediction result. In such a case, the detection unit 44 may determine that the feature point T is present below the second point P2, and move the second point P2 to the provisional feature point P3 between the first point P1 and the second point P2.

Then, the detection unit 44 performs second prediction processing of predicting a relative positional relationship between the provisional feature point P3 and the feature point T via a binary classification. The detection unit 44 uses the prediction model 38 in the second prediction processing, as in the first prediction processing. Then, the detection unit 44 performs second movement processing of moving any point of two points, a point that is not moved in the movement processing, which is immediately previously performed, based on the first point P1 or the second point P2 and the provisional feature point P3, to a new provisional feature point based on the prediction result obtained by the second prediction processing. In a case in which the second prediction processing and the second movement processing are repeatedly performed a predetermined number of times, the detection unit 44 sets a new provisional feature point between any point of the two points, the point that is not moved in the second movement processing, which is immediately previously performed, and the provisional feature point P3, and the provisional feature point P3. In the second movement processing, the detection unit 44 also sets the new provisional feature point as a point that divides the distance between the two points into two equal parts, as in the first movement processing.

As shown in STEP 2 of FIG. 7, the detection unit 44 inputs a y coordinate $y_{p3}$ of the provisional feature point P3 to the prediction model 38. The prediction model 38 outputs True as the prediction result. As a result, the detection unit 44 determines that the feature point Tis present below the provisional feature point P3, and moves the first point P1 to a new provisional feature point P4 between the first point P1 and the provisional feature point P3.

Similarly, in STEP 3 of FIG. 7, the detection unit 44 determines that the feature point T is present below the provisional feature point P4, and sets a new provisional feature point between the first point P1 and the provisional feature point P4. This new provisional feature point is used in next STEP 4 (not shown). As described above, the detection unit 44 repeatedly performs, a predetermined number of times, the processing of setting the new provisional feature point between the provisional feature point and any point of the two points of STEP, which is immediately previously performed, based on the prediction result of the up-down relationship between the provisional feature point and the feature point T.

The number of times the detection unit 44 repeatedly performs the second prediction processing and the second movement processing may be set as a fixed value in advance. In addition, for example, the detection unit 44 may determine that the convergence has occurred in a case in which a movement amount of the provisional feature point is equal to or less than a threshold value, and may end the second prediction processing and the second movement processing. In such a case, the number of times the detection unit 44 repeatedly performs the second prediction processing and the second movement processing is not fixed.

The detection unit 44 detects a final provisional feature point obtained by repeatedly performing the second prediction processing and the second movement processing a predetermined number of times, as the feature point T of the detection target.

Figure 8:
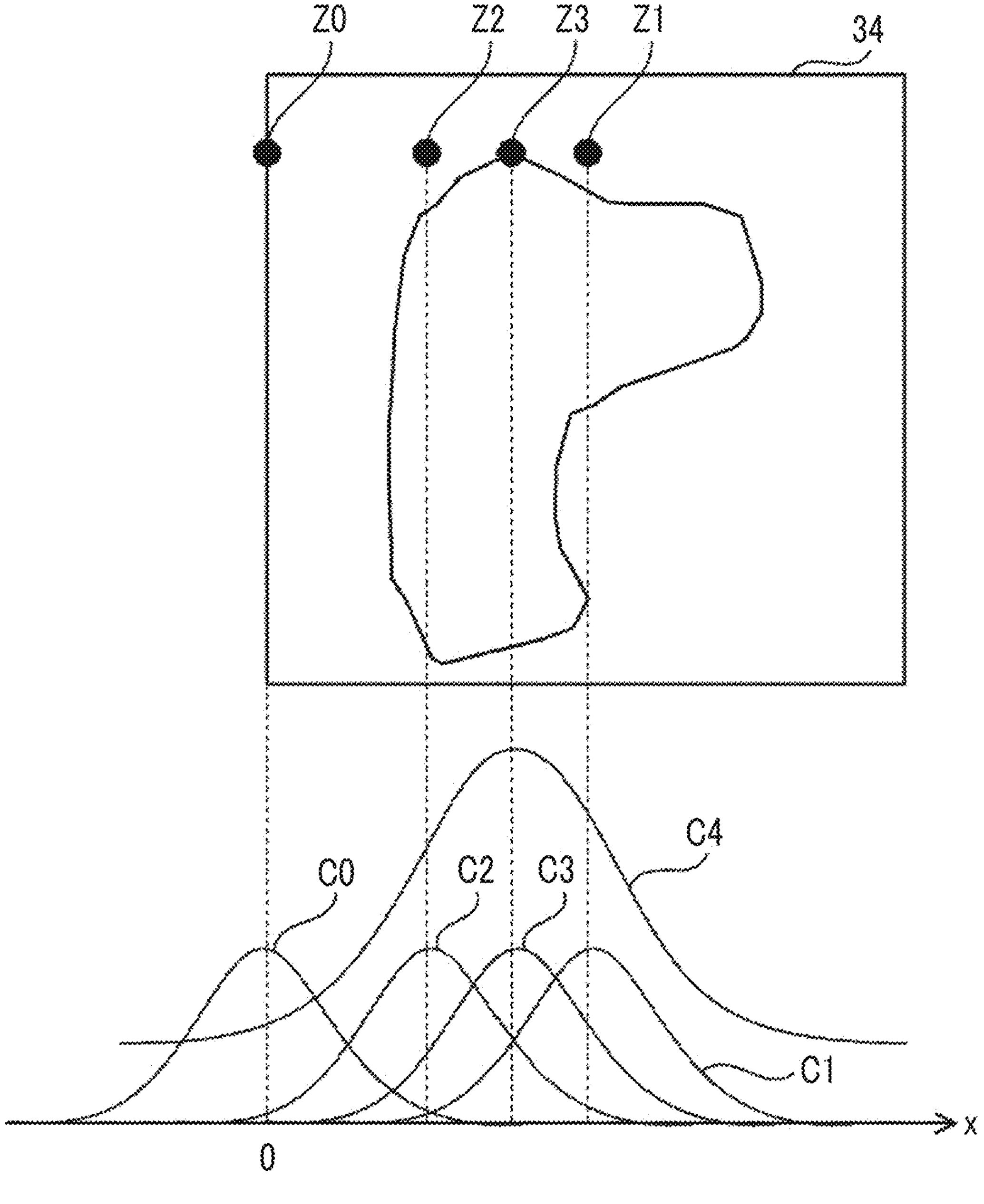
FIG. 8 is a diagram showing a method of determining a feature point according to a modification example.

It should be noted that the detection unit 44 may determine the feature point T of the detection target based on a history of the provisional feature point. As shown in FIG. 8 as an example, the detection unit 44 may detect a position having a highest probability in a probability distribution in which the individual probability distributions of the history of the provisional feature point are superimposed, as the feature point T. In the example of FIG. 8, points Z0 to Z3 represent histories of the provisional feature point, curves C0 to C3 represent probability distributions corresponding to the points Z0 to Z3, and a curve C4 represents a probability distribution obtained by superimposing the probability distributions represented by the curves C0 to C3. In this example, the detection unit 44 determines a position corresponding to an apex of the curve C4 on the medical image 34 as the feature point T.

Next, an operation of the image processing device 10 will be described with reference to FIG. 9. The CPU 20 executes the image processing program 30, to execute feature point detection processing shown in FIG. 9. The feature point detection processing shown in FIG. 9 is executed, for example, in a case in which an instruction to start the execution is input by the user.

Figure 9:
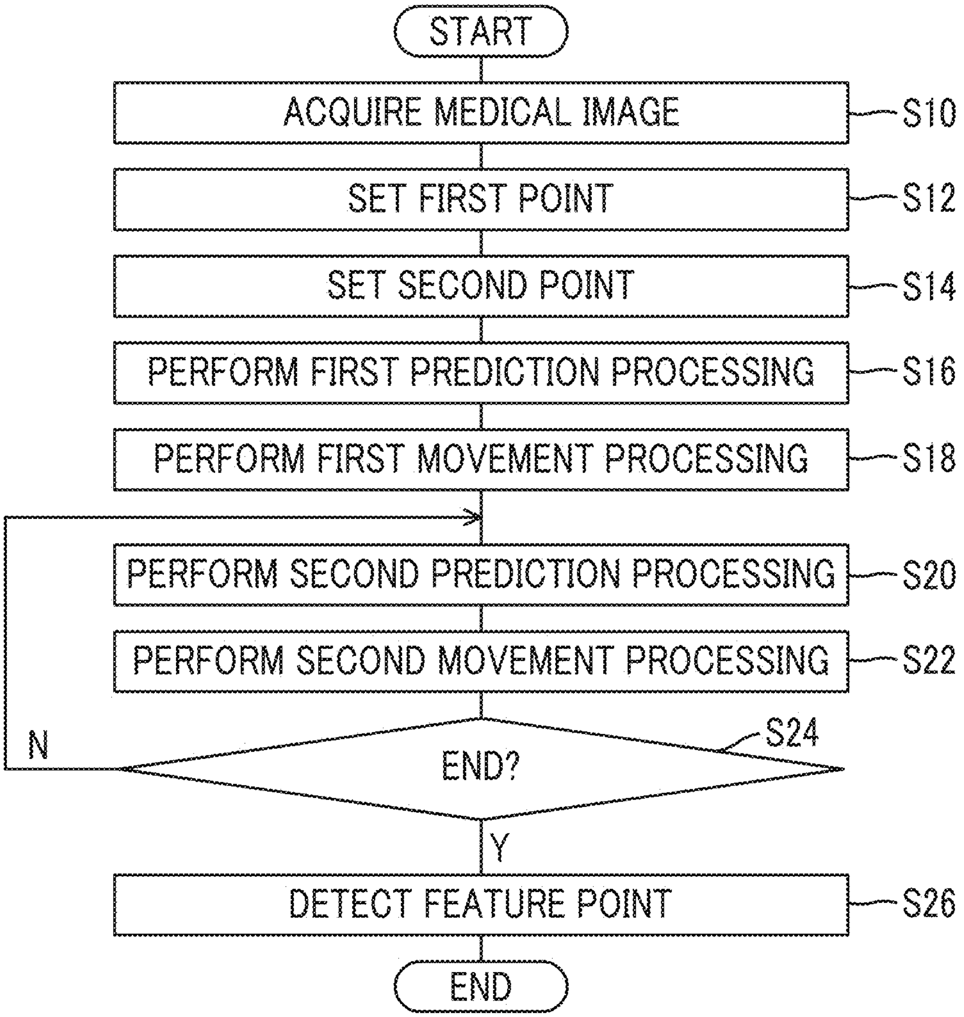
FIG. 9 is a flowchart showing an example of feature point detection processing.

In step S10 of FIG. 9, the acquisition unit 40 acquires the medical image 32 and the medical image 34 from the storage unit 22. In step S12, as described above, the setting unit 42 sets the first point P1 on the medical image 34 based on the detection result of the detection target for the medical image 32 acquired in step S10.

In step S14, as described above, the setting unit 42 sets the second point P2 to a point located such that the first point P1 and the second point P2 interpose the feature point T on the medical image 34 based on the anatomical positions of the detection target and the feature point T of the detection target, and the relative positional relationship between the first point P1 and the feature point.

In step S16, as described above, the detection unit 44 performs the first prediction processing of predicting the relative positional relationship between the first point P1 or the second point P2 and the feature point T via the binary classification. In step S18, as described above, the detection unit 44 performs the first movement processing of moving the first point P1 or the second point P2 to the provisional feature point P3 between the first point P1 and the second point P2, based on the prediction result of the first prediction processing.

In step S20, as described above, the detection unit 44 performs the second prediction processing of predicting the relative positional relationship between the provisional feature point P3 and the feature point T via the binary classification. In step S22, as described above, the detection unit 44 performs the second movement processing of moving any point of the two points, the point that is not moved in the movement processing, which is immediately previously performed, based on the first point P1 or the second point P2 and the provisional feature point P3, to the new provisional feature point based on the prediction result by the second prediction processing.

In step S24, the detection unit 44 determines whether or not a predetermined end condition is satisfied. Examples of the end condition include a condition in which the number of times steps S20 and S22 are repeatedly performed reaches the predetermined number of times. In addition, examples of the end condition include a condition in which the movement amount of the provisional feature point via the second movement processing, which is immediately previously performed, of step S22 is equal to or less than the threshold value. In a case in which the determination result in step S24 is No, the processing returns to step S20, and in a case in which the determination result in step S24 is Yes, the processing proceeds to step S26.

In step S26, the detection unit 44 detects the final provisional feature point obtained by repeatedly performing the second prediction processing in step S20 and the second movement processing in step S22 a predetermined number of times, as the feature point T of the detection target. In a case in which the processing of step S26 ends, the feature point detection processing ends. The feature point T detected by the above-described processing is used, for example, for determining the imaging range of the three-dimensional medical image.

As described above, according to the present embodiment, it is possible to efficiently detect the feature point from the medical image.

It should be noted that, in the above-described embodiment, a case has been described in which the medical image 34 is the image of a part of the range of the medical image 32, but the present disclosed technology is not limited to this aspect. For example, the medical image 34 may be an image that shows the same range as the medical image 32 and that has a higher resolution than the medical image 32. In such a case, for example, the CPU 20 may use an image obtained by a medical image capturing apparatus, such as the scout image, as the medical image 34, and may use an image in which the resolution of the medical image 34 is reduced as the medical image 32. In such a case, it is possible to reduce the calculation amount of the detection processing of the detection target for the medical image 32. Further, the medical image 32 may be an image in which the resolution of the scout image is reduced, and the medical image 34 may be an image of a part of a range including the detection target of the scout image.

In addition, in the above-described embodiment, a case has been described in which the center point of the range of the detection target represented by the detection result of the detection target for the medical image 32 is applied as the first point, but the present disclosed technology is not limited to this aspect. For example, a point on an end part of the range of the detection target represented by the detection result of the detection target for the medical image 32 may be applied as the first point. In such a case, an organ of which the end part is more easily detected than the center may be applied as the detection target. Examples of the organ of which the end part is more easily detected than the center include an organ of which the contrast with the surrounding organs is equal to or higher than a certain level.

In addition, a point at which the brightness within the range of the detection target represented by the detection result of the detection target for the medical image 32 is equal to or higher than a threshold value may be applied as the first point. The point at which the brightness is equal to or higher than the threshold value is, for example, a point corresponding to a lesion, a cyst, a calcification point, or the like.

Figure 10:
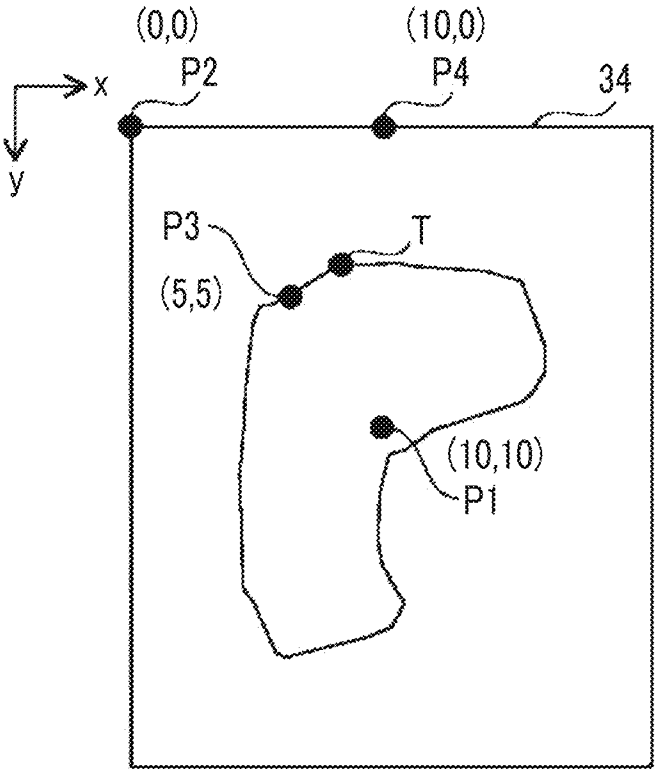
FIG. 10 is a diagram showing binary search processing according to the modification example.

In addition, in the above-described embodiment, a case has been described in which a positional relationship in one direction of the up-down direction is used in the binary search, but the present disclosed technology is not limited to this aspect. In the binary search, a positional relationship in two directions, the up-down direction and the left-right direction, may be used. In such a case, as shown in FIG. 10 as an example, the setting unit 42 sets, as the second point P2, a point at an upper left end part of the medical image 34 based on the anatomical positions of the detection target and the feature point T of the detection target, and the relative positional relationship between the first point P1 and the feature point T. Then, in such a case, the detection unit 44 moves the first point P1 or the second point P2 to the provisional feature point P3 between the first point P1 and the second point P2, based on the positional relationship between the first point P1 or the second point P2 and the feature point T in the up-down direction and the left-right direction. Further, in such a case, the detection unit 44 updates the provisional feature point P3 to the provisional feature point P4 based on the positional relationship between the provisional feature point P3 and the feature point T in the up-down direction and the left-right direction. As described above, the detection unit 44 can narrow down a range in which the feature point T is present on a two-dimensional plane. It should be noted that two numerical values in parentheses in FIG. 10 represent the x coordinate and the y coordinate of a point in the vicinity.

In this embodiment, each process is executed on an arbitrary computer. The arbitrary computer may execute these processes by means of a processor as hardware, a program as software, or a combination of the processor and the program. In such a case, the processor is configured to execute the various processes in this embodiment in cooperation with the program and may function as each unit or means in this embodiment. In addition, the order in which the processor executes these processes is not limited to the order described in this embodiment and may be changed as appropriate. The arbitrary computer may be a general-purpose computer, a computer for a specific purpose, a workstation, or any other system capable of executing each process.

The processor may be configured by one or more hardware, and the type of hardware is not limited. For example, the processor may comprise at least one of programmable logic devices such as CPUs (Central Processing Units), MPUs (Micro Processing Units), and FPGAs (Field Programmable Gate Arrays); dedicated circuits for performing specific processes such as ASICs (Application Specific Integrated Circuits); and other hardware such as a GPU (Graphics Processing Unit) and an NPU (Neural Processing Unit). The hardware may also be a combination of different types of hardware. When multiple hardware are configured to execute one or more processes of a processor, the said multiple hardware may exist in devices that are physically separate from each other, or in the same device. In any embodiment, the order of each process by the processor is not limited to the order described above and may be changed as appropriate. The hardware is configured by an electric circuit (circuitry) etc. that combines circuit elements such as semiconductor devices.

Furthermore, the program may be firmware or software such as microcode. The program may also be a group of program modules, each function of which may be performed by a processor configured to execute each of the program modules. The program may be program code or code segments stored on one or more non-transitory computer-readable media (e.g., storage media or other storage). The program may be stored in separate non-transitory computer-readable media located on devices that are physically separate from each other. The program code or code segments may represent any combination of procedures, functions, subprograms, routines, subroutines, modules, software packages, classes, instructions, data structures, or program statements. The program code or code segments may be connected to other code segments or hardware circuits by sending or receiving information, data, arguments, parameters, or memory contents.

In the above embodiment, it is explained that the image processing program 30 is stored (installed) in advance in the storage unit 22, but this is not limited to this. The image processing program 30 may be provided in a form recorded on a recording medium such as a CD-ROM (Compact Disc Read Only Memory), DVD-ROM (Digital Versatile Disc Read Only Memory), and USB (Universal Serial Bus) memory. In addition, the image processing program 30 may be provided in a form that the image processing program 30 is downloaded from an external device via a network.

The technology of this disclosure also extends to all types of program products. Program products include all types of products for providing programs. For example, program products include programs provided via networks such as the Internet, and non-temporary computer readable storage media such as CD-ROMs, DVDs, and USB memory devices that store programs.

In regard to the embodiment described so far, the following supplementary notes will be further disclosed.

Supplementary Note 1

An image processing device comprising: a processor, in which the processor is configured to: set a first point on a medical image including a detection target; and detect a feature point of the detection target from the medical image by performing, a predetermined number of times, a binary search based on the first point and a second point different from the first point on the medical image.

Supplementary Note 2

The image processing device according to supplementary note 1, in which the processor is configured to: based on a detection result of the detection target for a first medical image including the detection target, set the first point on a second medical image that includes the detection target and that is an image having a higher resolution than the first medical image or an image of a range of a part of the first medical image; and detect the feature point from the second medical image.

Supplementary Note 3

The image processing device according to supplementary note 2, in which a detection result of the detection target is a heat map representing a range of the detection target.

Supplementary Note 4

The image processing device according to any one of supplementary notes 1 to 3, in which the first point is a point set as a point that is easily detected from the medical image.

Supplementary Note 5

The image processing device according to supplementary note 4, in which the first point is a center point of a range of the detection target represented by a detection result of the detection target for the medical image.

Supplementary Note 6

The image processing device according to supplementary note 4, in which the first point is a point on an end part of a range of the detection target represented by a detection result of the detection target for the medical image.

Supplementary Note 7

The image processing device according to supplementary note 6, in which the detection target is an organ of which a contrast with surrounding organs is equal to or higher than a certain level.

Supplementary Note 8

The image processing device according to supplementary note 4, in which the first point is a point at which brightness within a range of the detection target represented by a detection result of the detection target for the medical image is equal to or higher than a threshold value.

Supplementary Note 9

The image processing device according to any one of supplementary notes 1 to 8, in which the processor is configured to: set the second point to a point located such that the first point and the second point interpose the feature point, based on anatomical positions of the detection target and the feature point and a relative positional relationship between the first point and the feature point, on the medical image.

Supplementary Note 10

The image processing device according to any one of supplementary notes 1 to 9, in which the processor is configured to: perform first prediction processing of predicting a relative positional relationship between the first point or the second point and the feature point via a binary classification; perform first movement processing of moving the first point or the second point to a provisional feature point between the first point and the second point, based on a prediction result obtained by the first prediction processing; perform second prediction processing of predicting a relative positional relationship between the provisional feature point and the feature point via a binary classification; perform second movement processing of moving any point of two points, a point that is not moved in the movement processing, which is immediately previously performed, based on the first point or the second point and the provisional feature point, to a new provisional feature point, based on a prediction result obtained by the second prediction processing; and set the new provisional feature point between any point of the two points in the second movement processing, which is immediately previously performed, and the provisional feature point in a case of repeatedly performing the second prediction processing and the second movement processing a predetermined number of times.

Supplementary Note 11

The image processing device according to supplementary note 10, in which the processor is configured to: detect a final provisional feature point obtained by repeatedly performing the second prediction processing and the second movement processing the predetermined number of times, as the feature point of the detection target.

Supplementary Note 12

The image processing device according to supplementary note 10, in which the processor is configured to: determine the feature point of the detection target based on a history of the provisional feature point.

Supplementary Note 13

An image processing method executed by a processor of an image processing device, the image processing method including: setting a first point on a medical image including a detection target; and detecting a feature point of the detection target from the medical image by performing, a predetermined number of times, a binary search based on the first point and a second point different from the first point on the medical image.

Supplementary Note 14

An image processing program causing a processor of an image processing device to execute a process including: setting a first point on a medical image including a detection target; and detecting a feature point of the detection target from the medical image by performing, a predetermined number of times, a binary search based on the first point and a second point different from the first point on the medical image.

What is claimed is:

1. An image processing device comprising:

a processor, wherein the processor is configured to:

set a first point on a medical image including a detection target; and detect a feature point of the detection target from the medical image by performing, a predetermined number of times, a binary search based on the first point and a second point different from the first point on the medical image.

2. The image processing device according to claim 1, wherein the processor is configured to:

based on a detection result of the detection target for a first medical image including the detection target, set the first point on a second medical image that includes the detection target and that is an image having a higher resolution than the first medical image or an image of a range of a part of the first medical image; and detect the feature point from the second medical image.

3. The image processing device according to claim 1, wherein a detection result of the detection target is a heat map representing a range of the detection target.

4. The image processing device according to claim 1, wherein the first point is a point set as a point that is easily detected from the medical image.

5. The image processing device according to claim 4, wherein the first point is a center point of a range of the detection target represented by a detection result of the detection target for the medical image.

6. The image processing device according to claim 4, wherein the first point is a point on an end part of a range of the detection target represented by a detection result of the detection target for the medical image.

7. The image processing device according to claim 6, wherein the detection target is an organ of which a contrast with surrounding organs is equal to or higher than a certain level.

8. The image processing device according to claim 4, wherein the first point is a point at which brightness within a range of the detection target represented by a detection result of the detection target for the medical image is equal to or higher than a threshold value.

9. The image processing device according to claim 1, wherein the processor is configured to:

set the second point to a point located such that the first point and the second point interpose the feature point, based on anatomical positions of the detection target and the feature point and a relative positional relationship between the first point and the feature point, on the medical image.

10. The image processing device according to claim 1, wherein the processor is configured to:

perform first prediction processing of predicting a relative positional relationship between the first point or the second point and the feature point via a binary classification;

perform first movement processing of moving the first point or the second point to a provisional feature point between the first point and the second point, based on a prediction result obtained by the first prediction processing;

perform second prediction processing of predicting a relative positional relationship between the provisional feature point and the feature point via a binary classification;

perform second movement processing of moving any point of two points, a point that is not moved in the movement processing, which is immediately previously performed, based on the first point or the second point and the provisional feature point, to a new provisional feature point, based on a prediction result obtained by the second prediction processing; and set the new provisional feature point between any point of the two points in the second movement processing, which is immediately previously performed, and the provisional feature point in a case of repeatedly performing the second prediction processing and the second movement processing a predetermined number of times.

11. The image processing device according to claim 10, wherein the processor is configured to:

detect a final provisional feature point obtained by repeatedly performing the second prediction processing and the second movement processing the predetermined number of times, as the feature point of the detection target.

12. The image processing device according to claim 10, wherein the processor is configured to:

determine the feature point of the detection target based on a history of the provisional feature point.

13. An image processing method executed by a processor of an image processing device, the image processing method comprising:

setting a first point on a medical image including a detection target; and detecting a feature point of the detection target from the medical image by performing, a predetermined number of times, a binary search based on the first point and a second point different from the first point on the medical image.

14. A non-transitory computer-readable storage medium storing an image processing program causing a processor of an image processing device to execute a process comprising:

setting a first point on a medical image including a detection target; and detecting a feature point of the detection target from the medical image by performing, a predetermined number of times, a binary search based on the first point and a second point different from the first point on the medical image.

* * * * *